(12) United States Patent
Gogichev

(10) Patent No.: US 8,877,919 B2
(45) Date of Patent: Nov. 4, 2014

(54) CELLULOSE-CONTAINING MASS

(76) Inventor: Vadim Gogichev, Zug (CH)

( * ) Notice: Subject to any disclaimer, the term of this patent is extended or adjusted under 35 U.S.C. 154(b) by 607 days.

(21) Appl. No.: 13/131,122

(22) PCT Filed: Dec. 3, 2008

(86) PCT No.: PCT/IB2008/003327
§ 371 (c)(1),
(2), (4) Date: May 25, 2011

(87) PCT Pub. No.: WO2010/064069
PCT Pub. Date: Jun. 10, 2010

(65) Prior Publication Data
US 2011/0226162 A1   Sep. 22, 2011

(51) Int. Cl.
C08B 1/00 (2006.01)
C08L 1/02 (2006.01)
C08L 97/02 (2006.01)

(52) U.S. Cl.
CPC . *C08L 97/02* (2013.01); *C08B 1/00* (2013.01); *C08L 1/02* (2013.01)
USPC .......................... 536/56; 106/163.01; 127/37

(58) Field of Classification Search
USPC ............................ 106/163.01; 127/37; 536/56
See application file for complete search history.

(56) References Cited

U.S. PATENT DOCUMENTS

| 4,601,431 A | 7/1986 | Watanabe et al. |
| 4,979,681 A | 12/1990 | Doenges et al. |
| 5,139,861 A | 8/1992 | Williams et al. |
| 2006/0043629 A1 | 3/2006 | Drzal et al. |

FOREIGN PATENT DOCUMENTS

| CN | 1317259 | 10/2001 |
| EP | 0161766 | 11/1985 |
| EP | 1220031 A | 7/2002 |
| GB | 592633 A | 9/1947 |
| JP | 2002088264 | 3/2002 |

OTHER PUBLICATIONS

Smith et al, "Pressure-Sensitive Tape and Techniques for its Removal From Paper", The Book and Paper Group Annual, vol. 2 (1983), pp. 1-11.*
International Search Report dated Aug. 25, 2009, issued in corresponding international application No. PCT/IB2008/003327.
Satge C et al: "Rapid homogeneous esterification of cellulose induced by microwave irradiation" Carbohydrate Polymers, Applied Science Publishers, Ltd. Barking GB, vol. 49, No. 3, Aug. 15, 2002, pp. 373-376, XP004350817 ISSN: 0144-8617 the whole document.

* cited by examiner

*Primary Examiner* — David M Brunsman
(74) *Attorney, Agent, or Firm* — Ostrolenk Faber LLP

(57) ABSTRACT

The present disclosure concerns a method for producing a cellulose-containing mass, including an organic material, the method comprising the steps a) preparation of an input comprising organic material and a liquid content; and b) exposing said input to an active zone of an electromagnetic field. Moreover a method for producing a composite material that is based on said cellulose-containing mass is disclosed as well as a product produced of said composite material.

25 Claims, No Drawings

CELLULOSE-CONTAINING MASS

CROSS REFERENCE TO RELATED APPLICATIONS

The present application is a 35 U.S.C. §371 National Phase conversion of PCT/IB2008/003327, filed Dec. 3, 2008, the disclosure of which is incorporated herein by reference. The PCT International Application was published in the English language.

BACKGROUND

1. Field of the Disclosure

The present invention is directed to a method for producing a cellulose-containing mass according to claim 1, a cellulose-containing mass according to claim 15, a method for producing a composite material according to claim 16, a composite material according to claim 21 and a product according to claim 22.

The method may be employed for diversity of practical uses. For instance, production of new building materials, different hardware, trimmings, interior stuff, various finishing coats of high resistibility and fastness etc. from farm waste of cereals (for example maize, rye, wheat, oats, barley, sorghum, rape, rice etc. and combinations thereof), staple fibers (cotton, flax, hemp, etc.), what makes such production economically compatible due to low price of inputs.

2. Related Art

Currently there are several composite materials of organic origin known which are for example suitable for packaging and construction applications. While wood fibers are quite common other natural fibers from crop or grain are used occasionally as fibrous fillers.

US2006043629A proposes to produce a reinforced bio-composite by processing of natural fibers (such as grass, rice straw, wheat straw, industrial hemp, pineapple leaf fibers) with a matrix of soy based bioplastic, by employing a coupling agent, i.e. a functional monomer modified polymer. Moreover the use of modified soy flour with functional monomers is explained in the context of industrial applications such as reactive extrusion and injection molding.

US 2008/181969 A addresses discoloration and structural, that is chemical or mechanical, degradation of composite materials comprising cellulosic components such as wood fibers, straw, grasses and other organic material that is cross linked by means of coupling agents to polymer components. The coupling agents, such as grafted-maleic anhydride polymers or copolymers, incorporate functionality capable of forming covalent bonds within or between the polymer and cellulosic components.

SUMMARY

It is an object of the present invention to provide an improved method of production of cellulose-containing masses, to provide said cellulose-containing masses and to provide methods for producing high-strength composite materials comprising original structures of organic materials, preferably originating from higher plants, which evolve their natural forms (e.g. stalks) through intracellular and intercellular structural linkage between different polymers and/or their moieties of different substances, functional groups, side chains and/or rests.

DETAILED DESCRIPTION OF THE EMBODIMENTS

The invention relates to production of high-strength composite materials and various items made of cheap organic raw-materials, preferably of stalk parts of higher plants, cell envelopes or membrane that contain sufficient quantity of cellulose, i.e. a high-molecular polysaccharide or glucan composed of β-1,4-linked D-glucose, or chitin, a glycan composed of beta-1,4-linked N-acetyl-D-glucosamine. In the present application the term cellulose-containing mass, input and/or composite shall comprise also chitin containing masses, inputs and/or composites or mixtures of cellulose and chitin containing masses, inputs and/or composites. Cellulose—the most common organic compound on Earth—is a high-molecular polysaccharide (glycan) with formula $[C_6H_7O_2(OH)_3]_n$ structured into polymer chains of β-glucose units, where n ranges from hundreds to some thousands. The invention allows to produce composite materials without requiring the use of exogenous polymeric components for bonding the organic materials, for example the plant particles to each other. In the context of the present application, the term exogenous denotes that the polymeric component origins not from the organic raw material being processed. It is an essential feature of the novel method of producing a cellulose-containing mass that the organic material is exposed to an active zone of an artificial electromagnetic field.

The new method for producing a cellulose-containing mass that may be used for producing a composite material being suitable for a high-strength product comprises at least the steps of a) preparation of an input comprising organic material and a liquid content; and b) exposing said input to an active zone of an artificial electromagnetic field.

According to preferred embodiments during manufacturing natural forms of inputs are destructed, as well as their organic linkages of intracellular and intercellular structures, until a liquid and/or paste mass is produced. This mass is used further as molding sand: it is re-shaped with new geometrical form, and structural linkages are recovered while this paste is curing. Cured paste becomes the end-use item.

Hereinafter, the term input is used to refer to the starting substance or mixture of substances that is exposed to the electromagnetic field whereas the term cellulose-containing mass denotes the product produced by the aforementioned method according to the invention. Said product is considered to be an intermediate product (also called output) as it is used further for the production of a wide variety of products.

The idea of the method lies in the fact that during manufacturing natural forms of inputs are destructed, as well as their organic linkages of intracellular and intercellular structures do, until homogenous liquid and/or paste mass is produced. Such a cellulose-containing mass is used further as molding sand: it is reshaped with new geometrical form, and structural linkages are recovered while this paste is curing. Cured paste becomes the end-use item.

In the present patent application, the term organic material is understood to comprise any cellulose containing material. Preferably, the input organic material comprises fibers mixed of cellulose molecules. Advantageously, the organic material origins from higher plants preferably from the group of true grasses of the family Gramineae (Poaceae) such as cereal crop or from cotton, hemp or flax or a mixture thereof. Good results have been produced in tests using at least one of cereal straw or rice straw or mixtures thereof as the organic material.

Preferably, the organic material is reduced to small particles or even pulp in a pre-processing step before the exposure to the electromagnetic field. The organic material of the input is preferably pre-processed/pre-treated depending on the type and conditions of the material. Such conditions are moisture, cleanness, presence of irrelevant natural or artificial elements, the microbial population, the percentage of β-cellulose in the pure input material responsible for generating bundles of micelles in the form of superfine fibrils. Preliminary determination of organic base content between fibrils and cellulose agglutinating these fibrils into the solidest fibers proved to be advantageous. As a rule, organic materials containing agglutinating or gelling substances like pectin are suitable, but organic materials containing substances like suberins or cutin that are by nature more hydrophobic are suitable as well. Alternatively organic materials containing lignin may also be used. Basic features and properties of products or produced items may be predefined by changing correlation of these and other secondary substances in the cellulose-containing mass.

Pre-treatments of the organic material encompass maceration, supplemented by electromechanical, hydrodynamic and ultrasonic exposure, as well as boiling, steaming and other known methods of processing raw plant material. Cellulose fibers have a noted distinction of high resistance against laceration, barely coming short of steel, and resistance against variance of mechanical and physical exposures. In case that the organic material is straw, e.g. rice or wheat or rye straw, a liquid having a pH-value of about 8 or above, more preferably about 8.4 or above may be used for maceration purposes followed and/or accompanied by electromechanical exposure, hydrodynamic exposure, ultrasonic exposure, boiling, steaming or a combination thereof.

Depending on the desired properties of the cellulose-containing mass (i.e. the output) and/or the pre-processing preparation, the endogenous liquid content, i.e. the liquid content provided by the raw organic material itself or originating from the raw organic material, is sufficient so that no exogenous or additional liquid has to be added. In its simplest embodiment, the liquid content is formed by water. However, other liquids, like organic solvents or gases or other fluids may be suitable as liquid contents depending on the demands on the manufacturability and on the characteristics of the article to be formed of the composite material later on. However, it is important that a proper function of the liquid content with the organic material is achievable. In case of liquids other than water it is essential to preferred embodiments of the invention that an excess of the liquid content is extractable in a suitable manner after the cellulose-containing mass is produced, where necessary.

Depending on the intended use and the intended processing method, the liquid content comprises preferably a solvent, e.g. for mellowing the organic material.

Processes of structural linkages recovery appear while homogenous mass is curing in new moulds; such processes are actually an integration of remains of β-glucose n-molecules into molecular compound with common to polymers formula $[C_6H_7O_2(OH)_3]_n$. Known presence of glucose molecules of three hydroxyl groups $[(OH)_3$ groups] in each remain makes it obvious that linkage of every remain couple of glucose molecule between each other is happened through lateral hydroxyl groups by abstraction of water molecules from them. Therefore, structural linkages recovery in homogeneous mass is taken place inadvertently when this mass is dehydrated, and results in its curing.

Tests have shown that the properties of the cellulose-containing mass hereinafter also called output are enhanced when the input which is exposed in the active zone of an electromagnetic field comprises an amount of ferromagnetic particles.

According to preferred embodiments of the present invention the ferromagnetic particles have an average length in a range of about 0.3 to about 25 mm, preferably in a range of about 3 to 5 mm and diameters of about 0.1 to about 5 mm, preferably of about 0.1 to about 2.5 mm. A ratio of 1:3 to 1:5 between diameter and length of the particles has been shown to be especially advantageous. The particles are cylindrical according to preferred embodiments. Based on the teachings of the present inventions the person skilled in the art will know that the size of the ferromagnetic particles depends upon and can be optimized according to the input material whereby the sizes may be out of the above mentioned ranges.

The size and shape of the ferromagnetic particles maybe chosen depending on the properties of the cellulose-containing mass, its workability and/or its producibility. Hence other sizes of the ferromagnetic particles may be suitable for working the present invention, too.

Test have shown, that high quality cellulose-containing masses were obtained when if the ratio of the ferromagnetic particles to the input was about 1 to about 20 weight percent. A liquid content of the input between 0 to about 40 percent. However, in further embodiments of the method, other ratios may be chosen according to paticular demands on the workability and/or the producibility of the cellulose-containing mass. They depend upon the type of process (periodic or constant) and within which volume of a container the process is worked. In a preferred embodiment with straw as input material, the working volume of a 2-zone container was 180 millilitres and the amount of the ferromagnetic particles was 14 grams per zone. The particles had the diameter of 250 micrometers on average and a length of 1500 micrometers on average. The ratio of liquid to input was as 1 to 3. The container was of continuous type. The time of exposure was up to 20 seconds.

The ferromagnetic particles support the desintegration of the organic material supra- and subcellular level, as well as the breaking of organic linkages of intracellular and/or intercellular structures. The stirred fluidized bed of ferromagnetic particles is energetically charged, and has increased capacities to destruct the whole range of organic materials in comparison to means known in the art. By mecanical crushing, breaking and/or grinding the until a more homogenous cellulose-containing mass is produced. Desintegration of the organic material is a key point of the invention.

A further advantage of the inventive method resides in the mechanical stirring effect of the ferromagnetic particles. Said ferromagnetic particles contribute to a mixing effect of the liquid content, the solvent, if any, and the organic material such that the quality of the cellulose-containing mass is further improved.

The cellulose-containing mass forms the base material for a vast range of composite products with a wide range of shapes, forms and designs. Said composites may be produced by direct shaping methods like casting, moulding, pressing or extruding or by subsequently machining the afore mentioned.

The active zone of the electromagnetic field is located between at least two linear electromagnetic inductors which are separated from each other by a gap measuring about 1 mm to about 5 m, preferably about 50 mm to about 1 m.

Depending on the requirements that have to be fulfiled by the cellulose-containing mass and/or the composite article the amount of ferromagnetic particles of non-retentive, i.e. low-coercive materials are added to the the input material before and/or during exposure of the input to the electromagnetic field.

According to preferred embodiments in which the production is set to a batchwise mode, a non-ferromagnetic mixing container may serve as the receptacle during the exposure of the input to the electromagnetic field. Depending on the requirements said mixing container may stretch over the whole distance between the inductors such that a stirred fluidized bed in the whole space of the zone is generated. Other receptacles or a passage for a continuous production mode are also suitable for working the present invention.

The presence of ferromagnetic particles of non-retentive, i.e. low-coercive materials in input to be processed in the active zone is particularly advantageous in large scale operations, where the distance between the inductors is about up to 1 or even several meters. In case of such large distances between the inductors it is preferred to increase the amount of ferromagnetic particles accordingly.

The linear electromagnetic inductors generate alternating electromagnetic fields that run towards each other from opposite directions. At every point in the active zone the inductors excite common alternating electromagnetic field with circular or elliptic hodograph of intensity of magnetic component, spinning around a common axis that is situated between inductors. The magnitude of magnetic component at every point of the axis equals to zero, but in every other direction and/or points it grows up to an amplitude value predetermined in the inductor. Tests proved that good results are achievable with amplitude values of about 0.2 Tesla (SI-Unit: T) to 0.25 T in the center of a 50 mm gap between the inductors with 14 g ferromagnetic particles present in a 180 ml container and an active zone between inductors of 50×165×80 mm and a magnetic force of about 0.03 T. The duration of exposure of the input to the magnetic field was about 20 seconds.

The destructive influence of the ferromagnetic particles on the particles of the organic material in the active zone is explained in more detail below. The impact of those ferromagnetic particles on intracellular and intercellular structures by means of its magnetic components A (A is vector potential of magnetic field), and B (B is magnetic field induction; A and B are related by formula B=rotA) is amplified through reduction of reluctance R within the active zone resulting in an increase of the magnetic flux in this active zone. The term rotA denotes the rotation of the vector potential.

The ferromagnetic particles increase the magnitude $B_i$ under $H_i$=constant at every point i such that the active value of gradA is increased. GradA denotes a gradient A.

Depending on the input and the desired characteristics of the cellulose-containing mass, the electromagnetic field produced by the at least two electromagnetic inductors has a force of about 0.01 to about 20 T, preferably about 0.01 to about 10 T, most preferred about 0.03 to about 1.2 T.

The exposure time of the input to the electromagnetic field is depending on the magnetic force applied and the material treated. Good results, that means cellulose-containing masses with superior properties have been achieved with a duration of said exposure measuring about 1 second to about 3 hours, preferably about 5 seconds to 5 minutes, most preferred about 20 seconds. The degree of the homogeneity of the cellulose-containing mass is adjustable by the electric parameters of the inductors.

After termination of the electromagnetic treatment of the input the cellulose-containing mass is ready to be used for producing a composite material and for producing a desired product of said cellulose-containing mass. Therefore, the technology and technique of producing products in accordance with the invention include at least the following basic steps:
1. Preliminary preparation of inputs and additives/improvers where necessary including additional techniques of manufacturing;
2. electromagnetic exposure;
3. post-processing by at least one of curing and molding of the cellulose-containing mass until a product (end-use item) is produced.

The term products encompasses end-products, such as for example panels, as well as semi-products, e.g. a core material of a laminated construction such as a sandwich construction, for example. In case of the latter, certain properties of the product may be improved for example in that at least one liner is adhesively bonded to said semi-product. An advantage of such sandwich constructions is that different properties such as structural strength, light-weight construction, fire resistance or a combination thereof are conferrable to a product. Depending on the embodiment of the product, one or several layers or liners may be made of metal, glass or carbon fibers or meshing.

Such non-organic fibers may be even added to the input or added later on to the cellulose-containing masses according to the invention.

Alternatively and/or in addition thereto, the cured composite material maybe subject to suitable surface treatment that is discussed later on in this description.

The process of drying and/or curing denotes an extracting of excessive liquid from the cellulose-containing mass. Processes of structural linkage recovery appear while the cellulose-containing mass is shaped, for example by curing in casts or molds. Such processes are actually an integration of remains of β-glucose n-molecules into molecular compound with common to polymers formula $[C_6H_7O_2(OH)_3]_n$. The presence of glucose molecules with three hydroxyl groups [(OH) groups] in each rest allow that linkage between said rests is faciliated through lateral hydroxyl groups by abstraction of water molecules from them. Therefore, structural linkage recovery of the organic material in the cellulose-containing mass takes place as soon as excessive liquid of the cellulose-containing mass is extracted, for example by dessication or drying in case of water, resulting in a curing process, In case of water being used as the liquid content the dehydration process is carried out under a predetermined temperature by any of a range of known suitable techniques. Such techniques are comprising and/or combining compression, extrusion and filtration as well as absorption, vacuum drying, blowdrying, heating, radiation, patting, vaporization under blower and other methods of desiccation, including natural air drying for example. Selection of a specific method of dehydration depends upon the specific requirements on the process and/or the article to be molded.

Depending on the characteristics of the cellulose-containing mass and/or the requirements on the composite material or the product to be produced thereof, the post-processing of the cellulose-containing mass is performed by at least one of molding, compression molding, injection molding. However, other shaping techniques for producing the product may be suitable.

In case of a post-processing by compression molding it is conceivable that the mixing container or a part thereof form a half of the mold at the same time. As general molding techniques are known to the person skilled in the art there a detailed description thereof is omitted.

Depending on the demands and the manufacturability, the molding and curing operation are carried out together or in sequence.

Further post-processing may be performed, e.g. for improving the resistance of the article made of the composite material against moisture or water, or to enhance its durability against chemically aggressive environments, the microbiological resistance, to confer the composite material and/or the product with required characteristics in view of a special type of resistance, a specific color, a particular smell or a combination thereof. For this purpose, specific modifiers and/or additives may be added into the input and/or the cellulose-containing mass prior to the extraction of any excessive liquid content.

Depending on the requirements, said specific modifiers and/or additives may be employed for achieving a particular homogeneity of the cellulose-containing mass and/or the composite material.

Special attention shall be paid to the fact, that several types of plant cells are encrusted by or containing compounds like inorganic minerals, for example silicates, or organic minerals like oxalates. The directed selection of organic materials containing certain amounts of said compounds like for example minerals can be used to provide cellulose-containing masses and composite materials according to the invention providing certain properties demanded by end-users. For instance, by selecting raw materials with employing the ability that the mentioned materials can acquire or significantly improve such characteristics and properties as conductance, transcalency (i.e. the thermal conductivity), soundproofness, resistance against moisture deformation, chemical and microbiological exposure and so on. In addition exogenous modifiers may be added if the cellulose-containing mass does not satisfy the requirements on the composite material.

Production of materials with predetermined properties (resistance, hydropathy, durability against chemically aggressive milieu, microbiological resistance, additional and/or special type of resistance, color, smell etc.) including those required by consumer's priorities is achieved by adding specific modifiers into homogeneous mass before dehydration and/or using special supplemental techniques while preparing homogeneous mass for curing.

Now, a few possibilities for surface treatment shall be addressed in brief. Depending on the requirements on the product made of the composite material, certain characteristics are achievable e.g. by applying one or several coatings with an impregnation, e.g. by way of immersion. Moreover, a coating layer with a specific color is applicable likewise.

All declarations in the description above apply likewise for the cellulose-containing mass, the method for producing the composite material, the composite material itself as well as for the produced thereof.

EXAMPLE

As a raw organic material the stalk part of cereal crop is chosen. Preferably the spike of the crop is missing. Preferably the straw is taken after harvest. In this example straw of wheat is used.

The straw has been pre-treated by chopping up the stalks of straw until the straw pieces had an average size of about 5 to 7 millimeters, mixing them with water and macerating them until the organic particles in the input had an average size of about 0.8 to 1 mm. In this example, the pH-value of the aqueous mixture was brought to a value of more than 8.4 and macerated for 1.5 to 2 hours. In further examples the time of maceration was reduced to 1.5 to 2 minutes. One part of water was added to three parts of straw (weight/weight).

After maceration the input comprising the straw mass was poured into a stainless steel container serving as a mixing container to be put in the active zone between two inductors.

An amount 14 g of ferromagnetic particles with cylindrical forms having an average diameter of 250 μm, an average length of 1500 μm were added to the straw-and-water mixture in the container prior to exposing the cellulose-containing mass to the electromagnetic field in order to increase the magnitude $B_i$ under $H_i$=constant at every point i such that the active value of An alternating electromagnetic field was generated such that it penetrated the active zone of 80 cm³ between the inductors (50 mm gap width) in the mixing container. The magnetic field provided that a vector of magnetic component created a circle or/and elliptic hodograph at any i point within that space excluding points of central axis defined between the inductors such that $B_j=\mu*H_j$ where $divB_j=0$, and, therefore, $rotA_i=B_j$. The intensity of the magnetic component was equal to zero at any j point on the central axis and the condition $H_j=0$, $B_j=0$ and $rotA_j=0$ was satisfied. So, activity of vector potential A of magnetic field with amplitude value from $A_j$ to $A_i$ was generated within the alternating electromagnetic field, such that gradA took effect in the space between the inductors.

The magnetic force measured about 0.3 T was applied. The input was exposed for 20 seconds to said alternating magnetic field. The electric source had 50 Hz.

Upon applying of the magnetic field, the ferromagnetic particles churned the input in the container lively. In this process every ferromagnetic particle performed a role of micro-mixer and micro-grinder due to its interaction with different hodographs of intensity vector $H_i$ at different i points within the container.

After termination of the exposure of the input to the electromagnetic field, the particles with an average particle size of the organic material remained in the cellulose-containing mass measured not less than 1 μm. However the magnetic treatment ensured a sufficient desintegration of the input material, so that sufficient numbers of cells and intra- and intercellular structures are destroyed.

Then, the cellulose-containing material was carried over from the mixing container to a mold, in the form of a Büchner Funnel. Suction filtration was used to increase the speed of filtration and subsequently the cellulose-containing mass was left to dry so that the dry and solid piece of composite material is left remaining. In this example, the evaporation process encompassed a combined method of filtration and natural drying until the weight mass of the composite material became permanent at a temperature of 30° C. Drying was controlled by a gravimetrical method until the sample product underwent structural and strength tests.

What is claimed is:

1. A method for producing a cellulose-containing mass, the method comprising:
   pre-treating a cellulose-containing organic material by maceration in a liquid having a pH-value of more than 8, followed or accompanied by electromechanical exposure, hydrodynamic exposure, ultrasonic exposure, boiling, and steaming;
   preparing an input comprising the pre-treated cellulose-containing organic material and an exogenous liquid content; and
   exposing said input to an electromagnetic field to destroy natural forms of input and organic linkages of intracellular and intercellular structures thereof until a liquid or a paste is obtained.

2. The method according to claim 1, wherein the input comprises a plurality of ferromagnetic particles.

3. The method according to claim 2, wherein an average length of the ferromagnetic particles is in a range of about 0.3 to about 25 mm and wherein an average diameter of the ferromagnetic particles is in a range of about 0.1 to about 5 mm.

4. The method according to claim 2, wherein the ferromagnetic particles have a ratio of diameter to length of about 1:3 to 1:5 and an essentially cylindrical form.

5. The method according to claim 2, wherein the ferromagnetic particles comprise about 1 to about 25 percent of the input by weight.

6. The method according to claim 1, wherein said electromagnetic field is generated between linear electromagnetic inductors generating electromagnetic fields that run towards each other from opposite directions, wherein the inductors excite a common alternating electromagnetic field with circular or elliptic hodograph of intensity of magnetic component, spinning around a common axis that is situated between said inductors.

7. The method according to claim 6, further comprising separating the electromagnetic inductors from each other by a distance measuring 1 mm to about 5 m.

8. The method according to claim 6, wherein a magnetic force of electromagnetic inductors measures about 0.01 to about 20 Tesla.

9. The method according to claim 6, further comprising separating the electromagnetic inductors from each other by a distance measuring about 50 mm to about 1 m.

10. The method according to claim 1, wherein the duration of said exposure measures about 1 second to about 3 hours.

11. The method according to claim 10, wherein the organic material comprises fibers.

12. The method according to claim 10, wherein the organic material originates from plants.

13. The method according to claim 12, wherein the organic material originates from at least one of cereal straw and rice straw.

14. The method according to claim 10, wherein the organic material originates from plants selected from Gramineae (Poaceae) family.

15. The method according to claim 1, wherein the liquid content comprises at least one of water and a solvent other than water.

16. A cellulose-containing mass being produced by a method according to claim 1.

17. A composite material comprising a cellulose-containing mass according to claim 16.

18. A manufactured article comprising a portion made with a composite material according to claim 17.

19. The article according to claim 18, comprising at least one liner being adhesively bonded to the cellulose-containing mass.

20. A method for producing a composite material comprising adding at least an additive or a modifier to a cellulose-containing mass produced according to claim 1.

21. The method according to claim 20, wherein the cellulose-containing mass is homogenous.

22. The method according to claim 20, wherein the cellulose-containing mass is post-processed by at least one of molding, compression molding, and injection molding.

23. The method according to claim 22, wherein excess liquid content is extracted from the cellulose-containing mass by at least one of drying and curing.

24. The method according to claim 1, wherein duration of said exposure measures 5 seconds to about 5 minutes.

25. The method according to claim 1, wherein said pH-value is more than 8.4.

* * * * *